June 7, 1955  J. L. YATES  2,710,333
ILLUMINATED MOTOR VEHICLE PLASTIC TRIM
Filed March 31, 1952
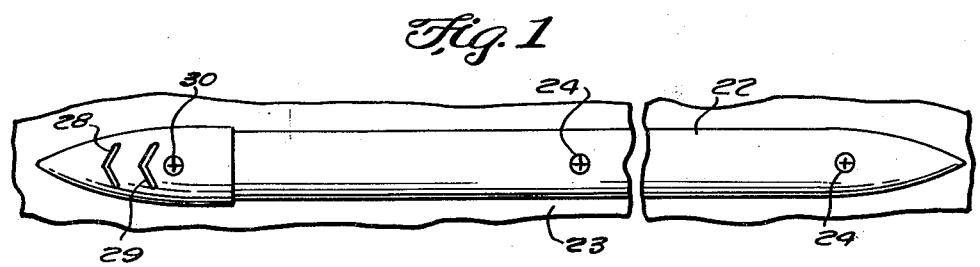
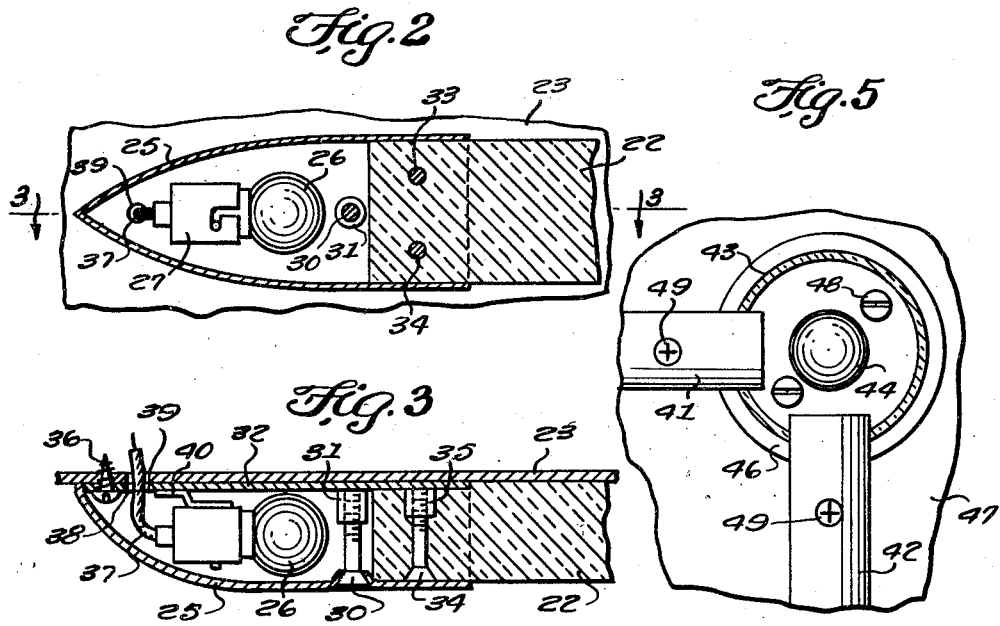
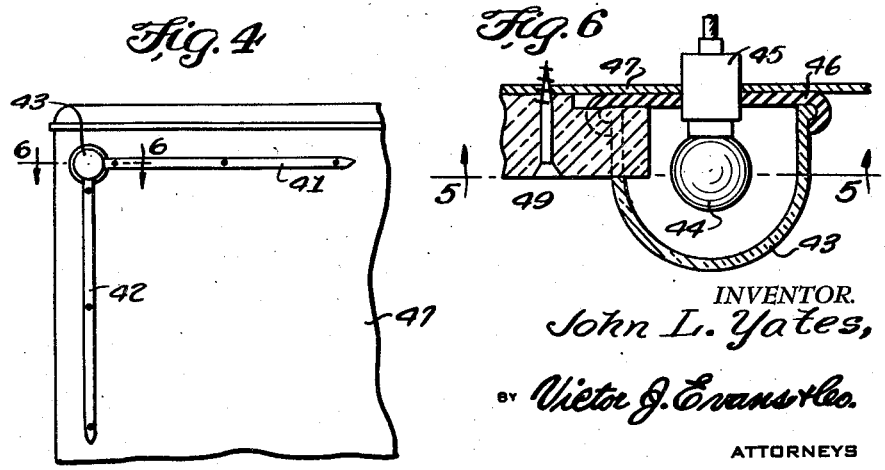
INVENTOR.
John L. Yates,
BY Victor J. Evans & Co.
ATTORNEYS United States Patent Office 2,710,333
Patented June 7, 1955

2,710,333

ILLUMINATED MOTOR VEHICLE PLASTIC TRIM

John L. Yates, Franklin, Nebr.

Application March 31, 1952, Serial No. 279,561

1 Claim. (Cl. 240—7.1)

This invention relates to illuminated trim for motor vehicles wherein elongated strips of plastic mounted on the sides of motor vehicle bodies are positioned whereby rays of light are transmitted throughout the length of the strips.

The purpose of this invention is to provide decorative strips for the sides of motor vehicles which not only improve the appearance of the vehicle in daylight but, in conveying rays of light throughout the length thereof improve the appearance of the vehicle in the dark, and in defining the outline of the vehicle provide additional safety means facilitating night driving.

With the conventional type of head and tail lights of a motor vehicle it is sometimes difficult to see vehicles from the sides and, particularly at intersections and in passing vehicles it is difficult to ascertain the exact position of one vehicle in relation to another. With this thought in mind this invention contemplates the use of illuminated plastic strips mounted on the extreme side surfaces of motor vehicles, boats, and the like, whereby ends of the strips are positioned to receive rays of light from auxiliary lights illuminating the strips throughout the length thereof whereby the outline of the vehicles is definitely determined.

The object of this invention is, therefore, to provide means for installing light conveying elements on the sides of motor vehicles, boats, and the like wherein the outline of the vehicles is definitely established.

Another object of the invention is to provide illuminated plastic elements adapted to be installed on side surfaces of motor vehicles and the like which not only provide safety means but also improve the appearance of the vehicle.

A further object of the invention is to provide illuminated plastic strips adapted to be installed on side surfaces of motor vehicles which are of simple and economical constructions.

With these and other objects and advantages in view the invention embodies elongated plastic strips preferably formed of Lucite or a similar plastic, with screws or other attaching means incorporated therein and with one of the ends of the strips formed to receive light rays from auxiliary light bulbs on a vehicle upon which the strips are mounted.

Other features and advantages of the invention will appear from the following description taken in connection with the drawings wherein:

Figure 1 is a side elevational view showing a plastic strip adapted to be illuminated wherein an auxiliary light bulb is provided in a cap on one end of the plastic strip.

Figure 2 is a vertical longitudinal section through the forward end of the strip shown in Figure 1, illustrating the construction of the light cap and showing the parts on an enlarged scale.

Figure 3 is a sectional plan through the end of the strip shown in Figure 2 being taken on line 3—3 of Figure 2.

Figure 4 is a detail illustrating modification wherein plastic strips extend from a plurality of sides of an auxiliary light housing whereby strips may be horizontally and vertically positioned.

Figure 5 is a section through the light housing shown in Figure 4 being taken on line 5—5 of Figure 6 and showing the parts on an enlarged scale.

Figure 6 is a sectional plan taken on line 6—6 of Figure 4 also showing the parts on an enlarged scale.

In the design shown in Figures 1, 2 and 3, a plastic strip 22 is secured to a fender 23 with screws 24 and a cap 25 is provided on one end of the strip, providing a housing for light bulb 26 which is removably mounted in a light socket 27.

The cap 25 is provided with ventilating slits 28 and 29 and a screw 30 extends through the cap and into a socket 31 on a base plate 32 of the cap.

By this means the outer surface 25 of the cap, which forms a shell is secured to the base 32 and the base is secured to the plastic strip 22 by screws 33 and 34 which are threaded into sockets 35 in the base 32.

The extreme end of the base 32 is attached to the fender 23 by a screw 36 with the strip 22 secured to the fender by screws 24 and the device is thereby readily attached to the fender of a motor vehicle.

The light 26 may be supplied with current by a wire 37 which extends through an opening 38 in the base 32 and also through an opening 39 in a fender 23. The socket 27 is attached to the base 32 with a bracket 40.

In the design as illustrated in the Figures 4, 5 and 6, plastic strips 41 and 42 extend from a light housing 43 wherein a light bulb 44 in a socket 45 provides rays of light that are transmitted throughout the length of the strips 41 and 42. In this design the light housing 43 is mounted in a base 46, of insulating material and the base is secured to a fender 47 with screws 48. The strips 41 and 42 are secured to the fender with screws 49 and although the strips are illustrated as being positioned at a right angle in relation to each other it will be understood that the strips may extend at different angles and as many strips as may be desired may be used.

With the parts arranged in this manner illuminated strips of light transmitting elements may be provided on the sides of pleasure cars, trucks, or other motor vehicles and also on boats and the like whereby the vehicles, and particularly the outlines thereof are visible in the dark.

It will be understood that modifications may be made in the design and arrangement of the parts without departing from the spirit of the invention.

What is claimed is:

In an illuminated trim for motor vehicles, a horizontally disposed elongated strip of light transmitting material arranged contiguous to the body of the vehicle and secured thereto, the inner surface of said strip being flat and abutting the body of the vehicle, the outer surface of said strip being rounded, there being a recess in an end of said strip adjacent the inner surface thereof, a cap fabricated of material which does not transmit light and including an outer wall, said cap being secured to one end of said strip and to said body, an inner base plate having a portion projecting into the recess in the adjacent end of said strip, a bracket secured to said base plate, a socket positioned in said cap and secured to said bracket, a light bulb arranged in engagement with said socket and enclosed by said cap, there being registering apertures in said base plate and in the body of the vehicle, a wire extending through said apertures and connected to said socket and adapted to be connected to a source of supply of electrical energy, a securing element connecting said base plate to the vehicle body, there being a plurality of spaced parallel slits in the outer wall of said cap, interiorly threaded socket members extending from said base plate, a securing element extending from said outer wall and threadedly engaging one of said socket members for securing said cap to said body, and other spaced securing elements threadedly engaging other of said socket members for securing the base to said strip.

References Cited in the file of this patent

UNITED STATES PATENTS

| | | |
|---|---|---|
| 1,462,065 | Lee | July 17, 1923 |
| 2,083,673 | Shenehon | June 15, 1937 |
| 2,186,143 | Neugass | Jan. 9, 1940 |
| 2,214,447 | Bave | Sept. 10, 1940 |
| 2,247,969 | Stewart | July 1, 1941 |
| 2,473,981 | Wood | June 21, 1949 |
| 2,481,321 | Marcinik | Sept. 6, 1949 |
| 2,543,226 | Briggs | Feb. 27, 1951 |

FOREIGN PATENTS

| | | |
|---|---|---|
| 893,724 | France | Feb. 21, 1944 |